United States Patent Office 3,203,761
Patented Aug. 31, 1965

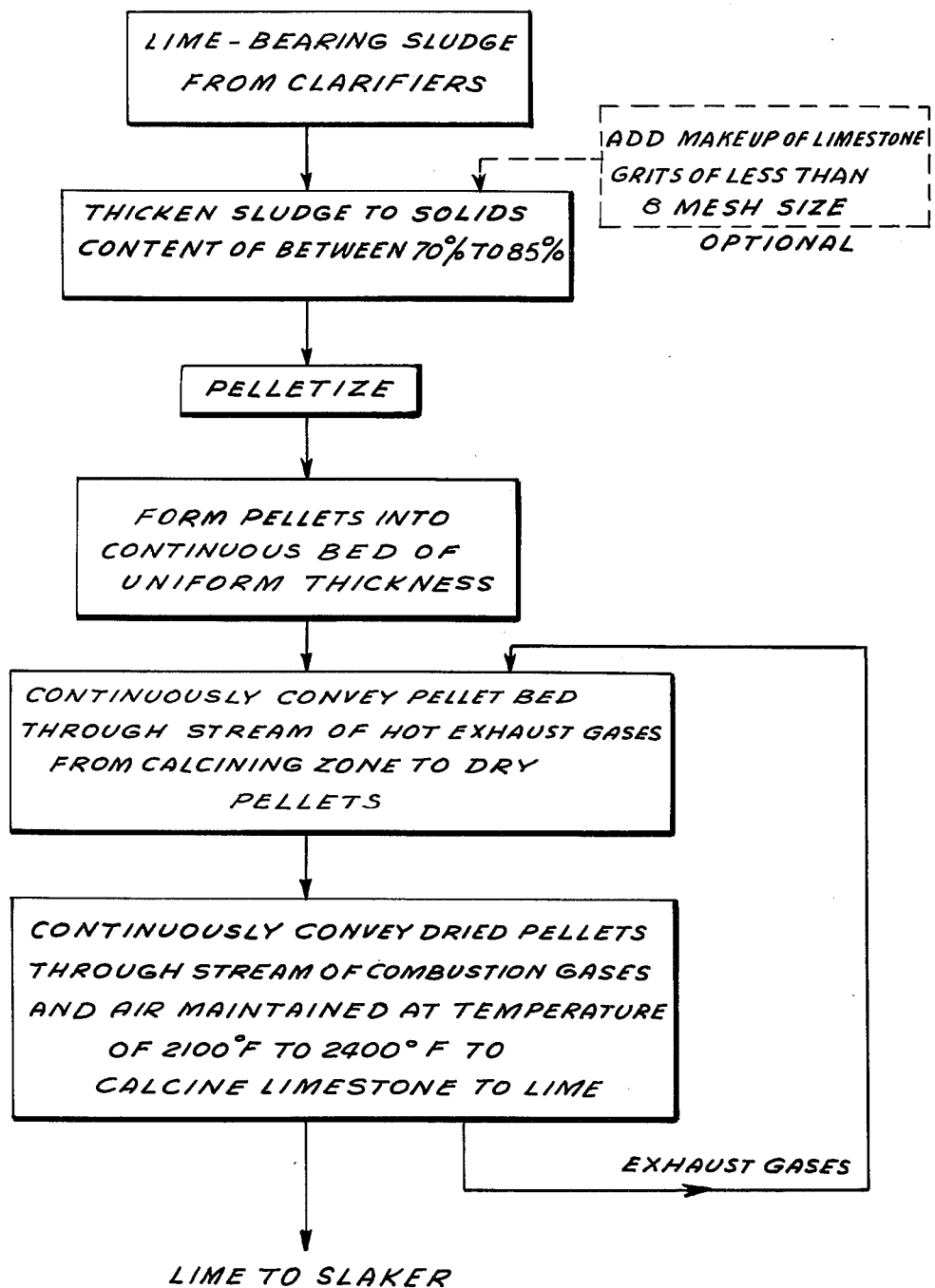

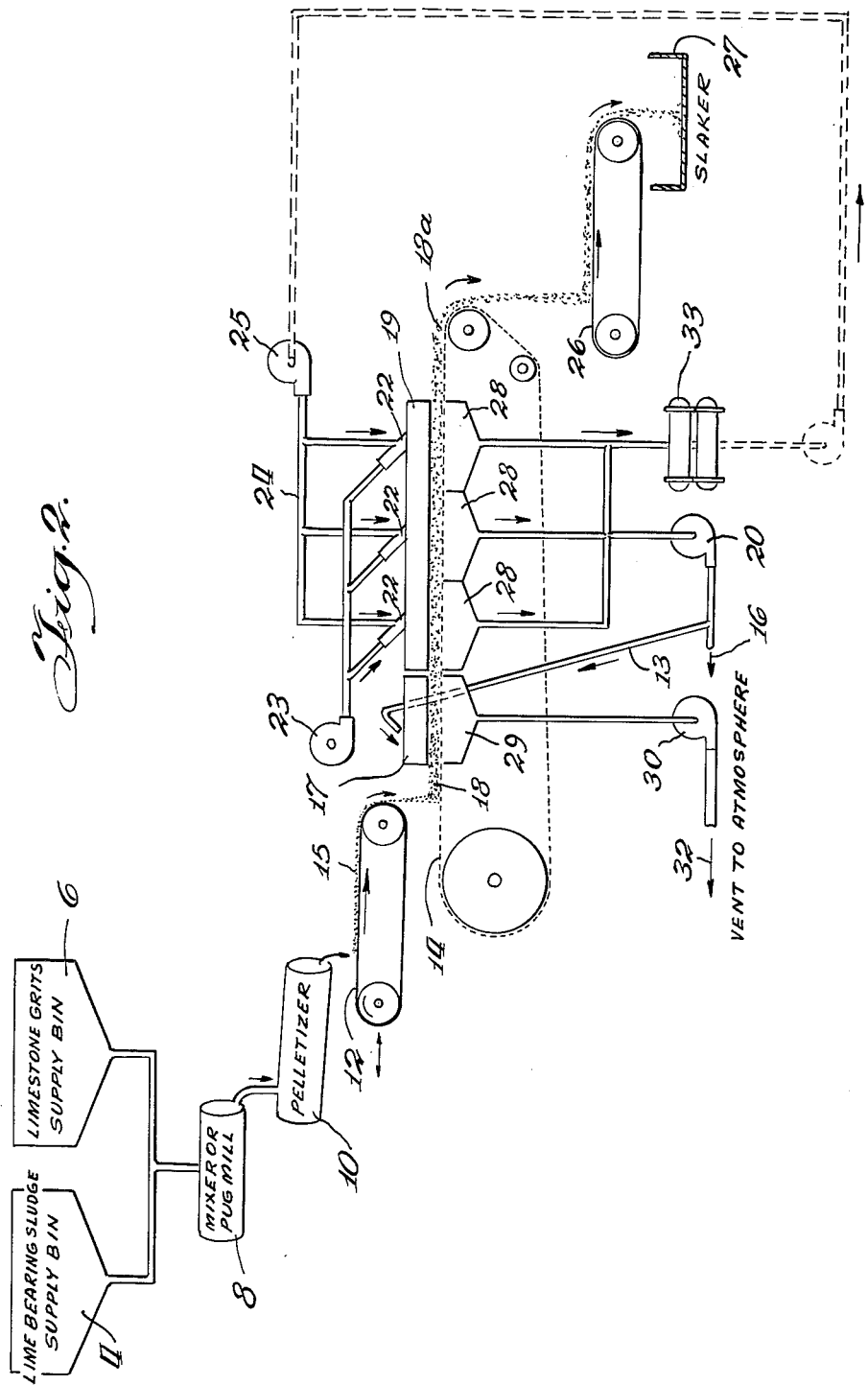

3,203,761
PROCESS FOR PRODUCTION OF LIME
Stewart M. Neuville, Harrison, Wis., assignor to Kimberly-Clark Corporation, Neenah, Wis., a corporation of Delaware
Filed Feb. 5, 1962, Ser. No. 171,161
4 Claims. (Cl. 23—186)

This application relates to calcining lime-bearing sludge to form calcium oxide or slakeable lime. More particularly it is directed to an improved process for calcining to calcium oxide the lime-bearing sludge byproduct from the green liquor causticizing step in sulfate pulping operations associated with wood pulp production.

Current practices for calcining such lime-bearing sludge utilize rotary kilns, reverberatory furnaces, or solids-fluidizing reactors. Operation of these plants is not particularly efficient principally because accurate control of the temperature, calcining rate, and other variables is difficult and time-consuming while the resulting products are not as uniform in quality as is desired. Also, capital costs for kilns and furnaces is undesirably high. Disposal of the dust discharged from lime kilns and other reactors is another major problem faced by conventional recovery plants, and requires supplementary scrubbing apparatus for satisfactory operation.

It is the general object of this invention to overcome these disadvantages while producing homogeneous lime of improved quality for reuse in causticizing green liquor.

It is a further object to provide a process which may be easily and accurately controlled to insure uniform calcining.

Another object is to reduce substantially the dusting nuisance usually associated with lime calcination processes.

Other objects will be apparent from the following description and drawings.

In the drawings:

FIG. 1 is a flow diagram illustrating one embodiment of the process of the present invention.

FIG. 2 is a schematic diagram illustrating an arrangement suitable for carrying out the process.

In recovering useful chemicals from the spent or black liquor of the sulfate pulping process, the black liquor is burned and the resulting chemical residue or smelt consisting largely of sodium carbonate is dissolved in water to produce green liquor. The green liquor is then causticized by adding lime thereto. Causticizing converts the sodium carbonate in the green liquor to sodium hydroxide, while the lime is changed to calcium carbonate in the form of a fine precipitate referred to as lime-bearing sludge or mud. The causticized liquor is pumped into decanters, or clarifiers, where the lime-bearing sludge, or mud, is removed from the bottom, and clear liquor, called white liquor, is removed from the top. The clear white liquor is sent to storage from where it may be pumped to the digesters as needed. The lime-bearing sludge is usually recovered, since economical operation of sulfate pulp mills requires the reconversion of the lime-bearing sludge to lime in slakeable form.

The thickened lime-bearing sludge discharged from the clarifier contains an appreciable amount of soda which must also be reclaimed. This is accomplished by conventional two stage washing, and reduces soda content to around 1 to 2%. After washing, the lime-bearing sludge is dewatered by conventional drum vacuum filters and discharged as a filter cake with a solids content of from 55% to about 75%. The thickened sludge is then reburned or calcinated to form lime.

In conventional lime reburning operations, the soda content of the sludge should not exceed 1.5 percent because, apart from chemical wastage when soda content exceeds 1.5 percent, caking trouble can be expected in the lime kiln. This requirement for a minimum soda content is one disadvantage which the present invention eliminates.

Also in conventional lime reburning, considerable amounts of lime dust and soda fumes are formed and discharged to the atmosphere through the lime kiln stack, causing some chemical loss and creating a major nuisance in air contamination unless supplemental washing or scrubbing operations are employed. This invention also eliminates that disadvantage.

The present process encompasses the adaptation of sintering conveyors, commonly employed in the ore-beneficiation industry, to the calcining of lime-bearing sludge. As illustrated by the flow diagram of FIGURE 1, lime-bearing sludge from the clarifiers is thickened to nodulizing or pelletizing consistency. The thickened sludge is then pelletized by conventional methods. The pellets are distributed in the form of a uniformly thick continuous bed on grates of a moving conveyor, similar to the type used in sintering ores or concentrates in the mining and metalliferous ore processing industries. The moving bed of pellets is conveyed first through a drying zone and then through a calcining zone. In the drying zone, heated gases, exhausted from the calcining zone hereinafter described, are employed to bring the pellets to substantial dryness. In the calcining zone, high temperature gases disassociate the carbon dioxide from the calcium carbonate and leave pellets in the form of lime which can be slaked easily. The lime obtained by this process is exceptionally uniform in quality, is devoid of overburned material usually found in regular lime-kiln products, is free of outside clinkers, and contains less underburned material than conventionally processed lime.

In carrying out this process, it is important to first thicken the sludge from the clarifiers to a consistency of at least 70% solids by weight in order to pelletize properly. While it is possible to obtain consistencies in this range on conventional drum vacuum filters, supplementary hot air, steam showers, or oven drying may be employed at this stage. Consistencies may be further adjusted by adding fresh limestone grits of less than 8 mesh size. Grits of larger size are undesirable since they inhibit good pelletizing action. If the solids content of the sludge is less than 70% it is too wet to pelletize, and further thickening is required. While a consistency of 70% solids does produce acceptable pellets, it was found that the sludge pelletized best at between about 75% to 80% solids, and in this range of thickness gave fewer problems in pellet formation size. The sludge also pelletized reasonably well up to about 85% solids, but above this range was found to be too dry to agglomerate and form pellets of suitable size. The preferred pellet size is in the range of ¼" to ⅜" in diameter.

As illustrated in FIG. 2, sludge at or near the proper consistency is supplied from bin 4, and either alone or in admixture with fresh limestone grits from supply bin 6, is passed through mixer or pug mill 8 to homogenize the mixture thoroughly. Water may be supplied at the pug mill to further control consistency. The mixture is then introduced to pelletizer 10, which may be a rotating drum 10, as shown, or a rotating saucer or other device conventionally used in the ore concentrating industry. A minor amount of water may also be added at this point to control more closely the pelletizing operation.

The pelletized material from pelletizer 10 then is deposited on conveyor 12 which preferably swings back and forth to deposit a layer or bed of pellets of uniform depth directly onto the grates of moving sintering conveyor 14. The moving bed of green pellets 18 is then introduced into drying zone 17 where hot exhaust gases from wind boxes 28 located below calcining zone 19 are forced through the pellet bed by discharge fan 20 and cooperating fan 30 to dry the pellets 18 to substantial dryness. The temperature of the gas used for drying is about 600° to 800° F. Such drying is necessary to prevent explosion or disintegration of the pellets from internal steam formation when subsequently introduced into the high temperature zone.

That portion of the gases from wind boxes 28 which is not employed in the drying step is discharged to the atmosphere at 16. Heat from these gases may also be recovered, if desired, by conventional heat exchangers. These excess gases may be discharged to the atmosphere without the usual scrubbing, because they contain far less lime dust and soda fumes than do discharge gases from prior art calcining operations. The low dust content is attributable to the fact that the lime-bearing sludge being calcined is in the form of pellets of relatively uniform size and devoid of the fines usually present in substantial amounts when finely divided sludge is calcined in conventional kilns. The portion 13 of exhaust gas which passes through the wet pellets in the drying zone is further scrubbed rather effectively by the wet pellets, and the exiting gas 32 vented to the admosphere from the drying zone is substantially dust-free. The process does not require the usual supplementary scrubbers as in calcining processes hitherto employed.

From drying zone 17 the dried pellets, proceed through calcining zone 19 where calcining is completed by a forced stream of high temperature combustion gas. The heat for combustion is obtained from fuel burners 22 located above calcining zone 19, with combustion air forced through the zone by blower 23. The combustion gas introduced into the calcining zone 19 is originally at a temperature of about 3000° F. which is ordinarily too high for calcining alone and if not controlled would cause undesirable overburning and some sintering or clinkering of the limestone. To control this, secondary air 24 is introduced with the aid of blower 25 to reduce temperature of the combustion gas to between about 2100° F. and 2400° F., in which range uniform calcining takes place without sintering or agglomeration. Calcium carbonate disassociates in the neighborhood of 1650° F. The material itself should not be heated over 2100° F., otherwise undesirable overburning may occur. Combustion gas temperatures are readily maintained in the proper range, to prevent the latter from happening, by adjusting the supply of secondary air.

The calcined material 18a, still in pelletized form, is discharged onto conveyor 26 from where it is transferred directly to slaker 27 or to storage, as may be desired.

While a so-called sintering conveyor is employed in the calcining method herein described, the term "sintering" is somewhat of a misnomer since it is noted that temperatures and time are controlled in this process so that only calcining, and no sintering occurs.

Also in conventional "sintering" operations additional fuel is commonly admixed in the pelletizing step to aid in the burning and fusing action required. In this calcining operation, no sintering is desired, and additional fuel has not been found necessary. The heat of the combustion gases alone is sufficient to accomplish the calcining.

The following specific example is a preferred method for carrying out the process.

Lime-bearing sludge having a solids content of about 70% by weight was admixed with about 10% by weight of limesone grits of less than 8 mesh size in pug mill 8. This mixture, having a solids content of about 75% by weight was fed to pelletizer 10 and formed into pellets ranging in size from ¼" to ⅜" in diameter. The green pellets 15 were deposited onto swinging conveyor 12, which distributed the pellets continuously onto the moving grates of sintering conveyor 14 in a uniform bed approximately 6" deep. The bed of pellets then was conveyed through drying zone 17 at the rate of about one foot per minute. The length of drying zone 17 in this example was about 8 feet. In drying zone 17, combustion gas 13 having a temperature of about 800° F., and consisting of a minor portion of the exhausted calcining gas from wind boxes 28 was delivered by fan 20, through the moving bed of pellets into windbox 29 removing most of the moisture from pellets 18. This gas was simultaneously scrubbed by the wet pellets, thereby removing substantially all residual dust. The dust-free scrubbed gas 32 was subsequently discharged to the atmosphere by fan 30.

The bed of dried pellets was then conveyed to the calcining zone 19 where hot combustion gases generated by three conventional wide angle burners 22 performed the calcining or burning operation. The length of calcining zone 19 in this example was about 32 feet. The hot gases were drawn through the bed of pellets 18 into wind boxes 28 by fan 20. The fuel employed in the burners was natural gas. Obviously other suitable fuels such as oil or producer gas may be utilized.

The hot gases from the burners 22 had an initial temperature of about 3000° F. and were cooled to about 2300° F. by the introduction of secondary air 24 before being passed through the bed of pellets.

Only part of the combustion gases which passed through the pellets in the calcining zone 19 and into wind boxes 28 was diverted through drying zone 17 while a major portion was vented to the atmosphere at 16. Alternatively, gases from the last wind box may be sent through a heat exchanger 33 to preheat secondary air 24.

The dust content of the combustion gases discharged from wind boxes 28 to the atmosphere at 16 was measured and found to contain only negligible amounts of limestone dust, i.e., in the range of about .0067 to .0096 gram/cu. ft. This is considerably less than the excessive amounts usually discharged by conventional calciners, thus eliminating the need for additional scrubbers.

The calcined lime pellets were finally deposited on conveyor 26 and delivered to slaker 27. The pellets were firm in structure, quite uniform in size, and contained only minor amounts of unburned lime, and no over burned lime or clinkers. The lime slaked easily and contained less than the average amount of grits found in conventionally reburned lime.

As noted above, the lime obtained by the herein described process was more uniformly burned and because of the relatively small size of the pellets slaked quickly and easily.

The depth of the pellet bed, the time of passage through the drying zone, and the time in the calcining zone in themselves are not critical but are all interrelated. For example, the depth of the pellet bed is easily adjusted with the time of movement through the calcining zone to obtain a minimum amount of unburned pellets. The time in the drying zone is adjusted to remove most of the moisture from the pellets before calcination and thus prevent them from exploding, or disintegrating, when they pass through the high temperature calcining zone. The overall speed of the conveyor determines the time of exposure in the drying and calcining zones, and is adjusted relative the gas temperatures employed to obtain uniform calcining. Obviously, at higher temperatures the movement of the conveyor grates will be relatively faster than at lower temperatures. The relatively short retention time and quick response in each of the treatment zones permits easy adjustment to obtain optimum conditions.

Other methods and means of applying the principles of this invention may be used without departing from its spirit or scope as specifically pointed out and described in the above specification and the appended claims.

What is claimed is:

1. In the sulfate pulping process, an improved method for reprocessing to slakeable lime the lime-bearing sludge obtained from causticizing green liquor which comprises starting with unwashed lime-bearing sludge as discharged from the clarifier and containing an appreciable amount of soda, adjusting the consistency of said sludge to a solids content of about 75% to 80% by weight, pelletizing said thickened sludge to form pellets ranging in size from about ¼" to ⅜" in diameter, forming a moving bed of pellets therefrom, passing first stream of gas heated to about 600° F. to 800° F. through said moving bed substantially to dry said pellets, then passing a second stream of gas heated to a temperature within the range of about 2100° F. to 2400° F. through said bed of pellets, said second stream of gas being sufficiently hot to raise the temperature of said pellets to disassociation temperature whereby the pellets are calcined to lime suitable for slaking.

2. In the sulfate pulping process, an improved method for reprocessing to slakeable lime the lime-bearing sludge obtained from causticizing green liquor which comprises starting with unwashed lime-bearing sludge as discharged from the clarifier and containing appreciable amounts of soda, thickening said sludge to a solids content of about 75% to 80% by weight by dewatering said sludge and mixing fresh limestone grits therewith, pelletizing said thickened mixture and forming a moving bed of pellets therefrom, passing a first stream of gas heated to a temperature of about 600° F. to 800° F. through said moving bed substantially to dry said pellets then passing a second stream of gas heated to a temperature of about 2100° F. to 2400° F. through said pellet bed, the temperature of said second stream of gas being sufficient to cause the carbon dioxide to disassociate from said pellets whereby lime suitable for slaking is obtained.

3. In the sulfate pulping process, an improved method for reprocessing to slakeable lime the lime-bearing sludge obtained from causticizing green liquor which comprises starting with unwashed lime-bearing sludge as discharged from the clarifier and containing appreciable amounts of soda, adjusting the consistency of said sludge to a solids content of about 75% by weight by dewatering said sludge and mixing fresh limestone grits therewith, pelletizing said thickened mixture and forming said pellets into a moving bed of uniform depth, passing a first stream of gas heated to a temperature of about 800° F. through said moving bed of pellets substantially to dry said pellets then passing a second stream of gas heated to a temperature of about 2300° F. through said moving bed of pellets, the temperature of said second stream of gas being sufficient to cause the carbon dioxide to disassociate from said pellets whereby lime suitable for slaking is obtained.

4. The process of claim 3 in which the first stream of gas comprises a portion of the exhaust from the second stream of calcining gas.

References Cited by the Examiner
UNITED STATES PATENTS

| | | | |
|---|---|---|---|
| 2,054,156 | 9/36 | Finkeldey | 263—53 |
| 2,167,120 | 7/39 | Lloyd | 263—53 |
| 2,178,586 | 11/39 | Joachim | 23—186 |
| 2,214,345 | 9/40 | Pike | 263—53 |
| 2,283,758 | 5/42 | Pike | 263—53 X |
| 2,465,410 | 3/49 | White | 23—184 |

MAURICE A. BRINDISI, *Primary Examiner.*

FREDERICK L. MATTESON, Jr., *Examiner.*